Oct. 11, 1938.  B. P. GRAY  2,132,614
NONSKID DEVICE FOR VEHICLE WHEELS
Filed July 23, 1935   2 Sheets-Sheet 2
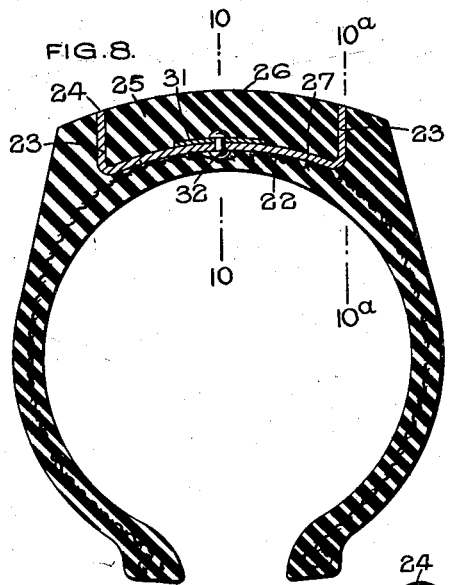
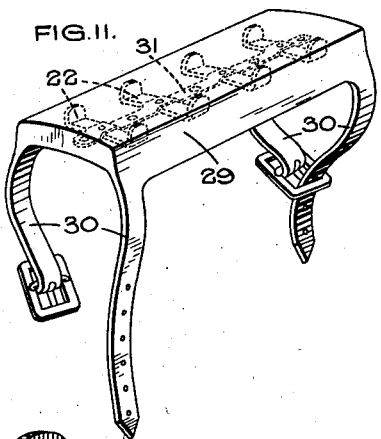
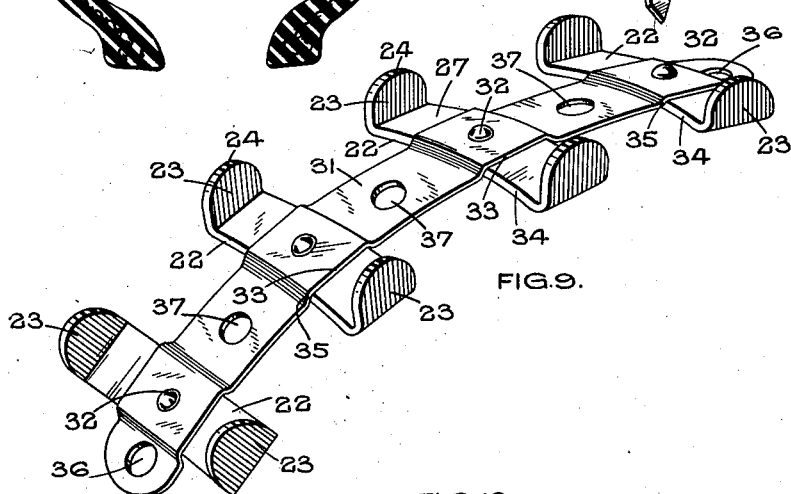
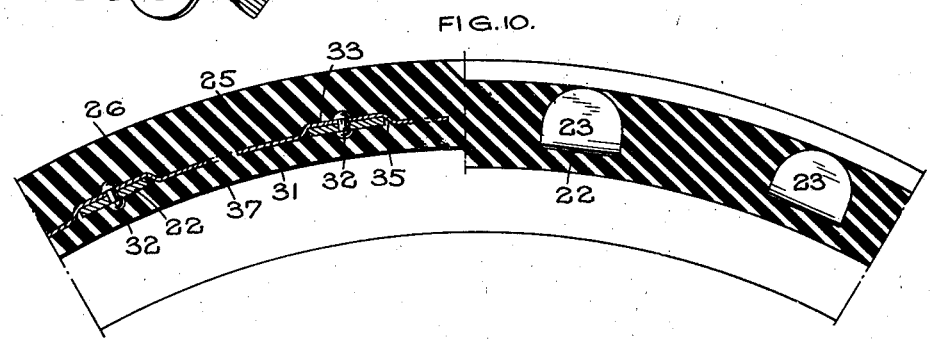
INVENTOR:
BERTRAM PARROTT GRAY
BY: Francis E. Boyce
ATTORNEY Patented Oct. 11, 1938

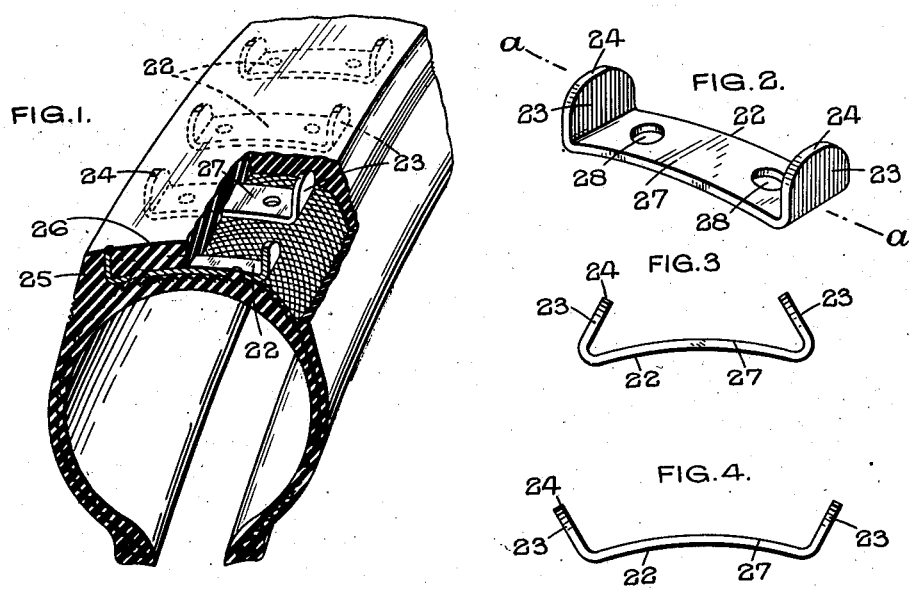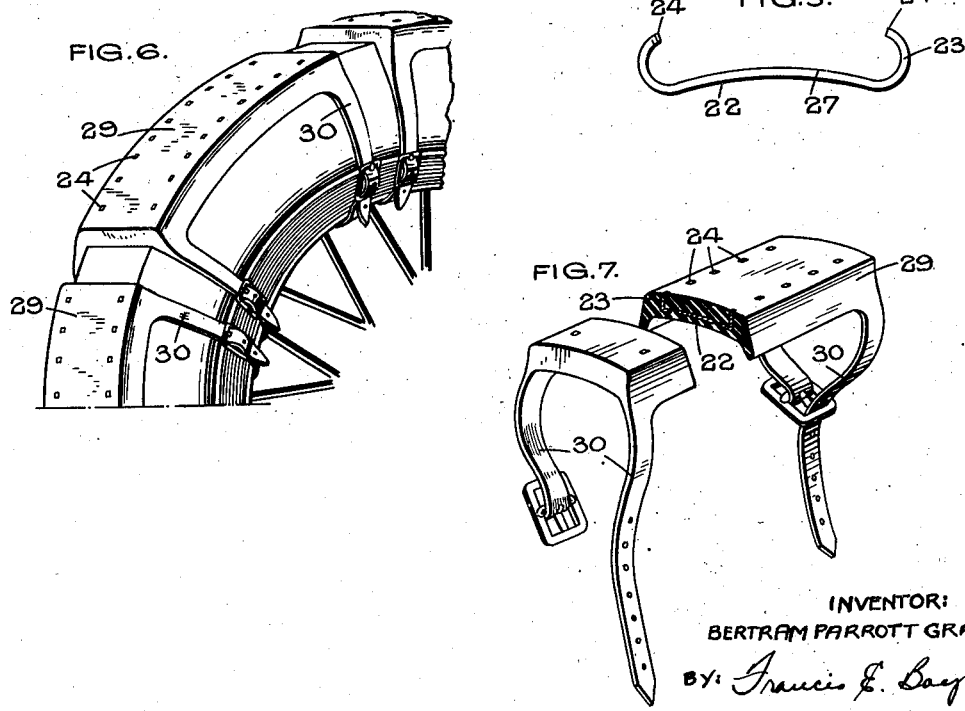

2,132,614

UNITED STATES PATENT OFFICE 2,132,614

NONSKID DEVICE FOR VEHICLE WHEELS

Bertram Parrott Gray, Birmingham, England

Application July 23, 1935, Serial No. 32,706
In Great Britain January 9, 1934

2 Claims. (Cl. 152—211)

This invention relates to non-skid devices for vehicle wheels, and is concerned with such devices of the type which comprise one or more non-skid elements, usually of metal which are embedded within a tread, such elements comprising one or more ribs, flanges or other projections of elongated form which extend outwardly of the tread to engage with the road surface to prevent skidding.

The expression "tread" herein used and in the appendant claims should be understood as embracing either a tread forming part of the wheel tyre itself, or a tread formed separately therefrom and secured or adapted to be secured upon the exterior of the tyre.

Non-skid devices of this type as hitherto proposed have comprised elements of channel form in cross section embedded within the material of the outer cover of the tyre, with the sides of the channel disposed longitudinally of the tyre and extending flush with the road engaging face of the tyre tread to form a non-skid surface, and with such devices the base portion of each element has been provided with openings through which the material of the tyre extends to secure together the material on opposite sides of this base, but with all these constructions, the non-skid surface extended longitudinally of the tyre for the full length of the base of the element, and in consequence it was found that on engagement of the ends of the non-skid surface with the road during the rotation of the tyre in use, there was a tendency for the elements to tilt about a lateral axis, thus producing a toeing and heeling movement of the elements relative to the tyre with a result that the cover material was damaged and the elements eventually forced out of the tyre.

One of the objects of this invention is to provide an improved form of non-skid device which is free from the above disadvantages.

A further object of this invention is to provide a non-skid device of simple construction and which is unusually efficient in preventing skidding.

Other objects will become apparent from the following description of my invention.

Referring to the drawings:

Figure 1 is a perspective view of a portion of a vehicle wheel tyre provided with a plurality of one form of non-skid elements constructed in accordance with this invention, the tyre being depicted with a portion of the material removed for the sake of clarity.

Figure 2 is a perspective view of one of the elements of the preceding construction.

Figures 3, 4 and 5 are end views of three modified constructions of non-skid elements.

Figure 6 is a perspective view showing a portion of a wheel tyre provided with treads formed separately from the tyre and having non-skid elements of a form similar to that of Figure 2 embedded therein.

Figure 7 is a perspective view taken partly in section of one of the treads prior to mounting upon the tyre.

Figure 8 is a cross sectional view of a tyre having embedded in the tread thereof a further form of non-skid device constructed in accordance with this invention.

Figure 9 is a perspective view of the same device prior to its embedment in the tyre tread.

Figure 10 is a longitudinal section of Figure 8, the left-hand half of the figure being taken on the line 10—10 and the right-hand half on the line 10a—10a respectively of Figure 8.

Figure 11 is a perspective view of a tread formed separately from the tyre and provided with a non-skid device of the same construction.

In the construction illustrated in Figures 1 and 2, the non-skid device comprises an element 22 formed from strip metal of flat section bent to channel or U configuration with the side portions 23 of the channel shaped element substantially parallel. Conveniently, the distance between the side portions 23 of the element is substantially greater than the width of the strip metal from which it is formed so that when the element is embedded within the tyre its overall dimension or length in a direction longitudinally of the tyre is substantially less than the distance between the said side portion.

The free ends or outer edges 24 of the side portions 23 are rounded to a radius so that these ends are of convex and substantially semi-circular form, and a plurality of elements thus constructed are in this embodiment of my invention embedded within the tyre tread 25 during the manufacture of the tyre so that the side portions are engaged on each of their sides by the material of the tread and extend outwardly thereof with their edges 24 substantially flush with the road engaging face 26 thereof to form the non-skid surface; the side portions 23 of each element being disposed with their major axes extending substantially longitudinally of the tyre tread so that the edges 24 provide substantial resistance to skidding in a direction transverse to the direction of movement of the vehicle.

By rounding the corners of the edges 24, these edges on each side of the non-skid surface are engaged by the material of the tread while the base 27 of each channel shaped element extends longitudinally of the tyre tread beyond the non-skid surface which engages the road with a result that during rotation of the wheel, only the medial part of the element adjacent the centre line a—a thereof receives the full load while the end parts of the element provide resistance to tilting of the elements about a lateral or transverse axis during the rotation of the wheel, with a result that the base 27 of the element is maintained substantially parallel to the road engaging face 26 and any toeing and heeling movement of the element relative to the tread is avoided.

By making the overall dimensions or length of the elements in a direction longitudinally of the tread substantially less than the distance between the side portions 23, the liability of the elements to crack or disintegrate during use is reduced.

In order to maintain the bases 27 of each element parallel to the road engaging face 26 of the tread across the entire width of the base, the latter is curved about a longitudinal axis to a degree corresponding to the curvature of the face 26.

With a view to providing additional anchorage between the elements of the tyre tread, the base 27 of each element is provided with openings 28 through which the material of the tread extends, and similar openings may if desired be provided in the side portions of each element for the same purpose.

Instead of making the side portions 23 of each channel shaped element parallel to each other they may converge towards or diverge away from each other as shown in Figures 3 and 4 respectively; alternatively, the side portions may, as shown in Figure 5, be of curved configuration, with their outer edges 24 converging towards one another.

In each of these latter constructions, the edges 24 are rounded as in the case of the construction first described so that the base 27 of each element still extends longitudinally beyond the non-skid surface which engages the rod.

With the above described construction, a large number of non-skid elements are embedded within the tread of a single tyre so that each element is spaced apart by a comparatively small distance and the elements extend entirely around the tyre.

Instead of mounting the elements within the tread of the tyre itself, they may, as shown in Figures 6 and 7, be embedded within a separate tread 29 of elongated form provided at each end with a pair of straps 30 for securing the separate tread detachably to the exterior of the outer cover of an ordinary tyre adjacent the tread thereof, as is shown in Figure 6, such construction being particularly suitable for application to existing tyres.

With this arrangement, the separate treads may extend completely around the tyre and be spaced apart by a comparatively small distance.

In the modified construction illustrated in Figures 8 to 10, the elements are mounted in spaced relationship upon a locating portion comprising a band 31 formed from thin steel or other flexible metal or material, the base 27 of each element being attached to the band by a rivet 32 with the side portions 23 of each element disposed longitudinally of the band.

Adjacent the point of attachment of each element to the band, the latter is recessed as at 33, and the bases of the elements are disposed within the recesses with their edges 34 in engagement with the sides 35 of each recess so that angular movement between the elements and band is prevented.

Alternatively, the base 27 of each element may be so recessed and the band may be of plain form, or alternatively both the band and the base of each element may be provided with recesses for the same purpose.

Conveniently, the band extends within the channel shaped elements so that the latter are retained positively within the tread.

The elements and band thus assembled are in this construction embedded within the tread 25 of the tyre during the manufacture of the latter, with the band extending longitudinally of the tread and substantially parallel to its road engaging face 26 and with the side portions 23 of the channel shaped elements extending outwardly of the tread with their edges 24 again substantially flush with the face 26 to form the non-skid surface.

Conveniently, the band 31 and the elements 22 with the exception of the non-skid surface thereof, are enclosed completely by the material of the tyre tread which thus engages the outer side of the band and thus maintains the latter and the elements in position within the tread.

Each end of the band is apertured as at 36 so that a number of bands provided with elements can be connected together so that they extend completely and continuously around the tyre. Alternatively, the bands may be disconnected and left spaced apart, or if desired a single band may be employed which extends completely around the tyre having its ends attached together, or alternatively left free.

In this construction, instead of providing the base of each element with openings 28, these are dispensed with, and openings 37 provided instead in the band for the same purpose.

Instead of connecting the elements positively to the band by rivets, the latter may be omitted and the bases of the elements may be mounted freely within the recesses 33 of each band; the latter engaging the bases and maintaining the elements positively within the tread. With this arrangement, the elements may if desired be provided with openings as shown in Figure 2.

Alternatively, instead of providing the elements and/or the band with recesses, a rivet attachment may be obtained between the elements and band by connecting them by means of a non-circular rivet, or by employing two rivets or by welding the elements to the band.

Alternatively, the elements and band may be formed integrally by pressing them out from a suitable length of metal, and with such an arrangement, the elements need not be of channel or U shape, and in fact opposite edges of the band may be pressed up to constitute elements in the form of ribs, flanges or other projections, and the elements at each edge of the band may be staggered relative to each other.

Further, in this construction elements of the form shown in Figure 3, 4 or 5 may be employed.

Again, two, or if desired, more than two bands may be employed for connecting individual elements together.

Instead of mounting the elements and band within the tyre itself, they may as in the case of the preceding construction, be embedded similarly within a separate tread shown in Figure 11 again provided with straps for securing it detachably to the outer cover of an ordinary tyre, such a construction being particularly suitable for application to existing tyres.

With this arrangement, the ends of individual bands are not joined together, while the separate treads may extend continuously and completely around the tyre as in the case of the preceding construction.

With the construction illustrated in Figures 8 to 11, the stresses imparted to the non-skid elements during skidding will be distributed over a relatively large part of the material of the tyre tread so that the material is not likely to be torn or damaged. Further, there is little liability with this construction of the elements becoming broken within the tread.

A further advantage attached to this construction is that each individual element is located definitely within the tread and there is little likelihood of it creeping longitudinally along the tread, or becoming displaced outwardly of the tread during use.

In all of the constructions described above, each element may have one or more additional projecting portions extending outwardly of its base and flush with the road engaging face 26 of the tread to form an additional non-skid surface, and such projecting portions may be of elongated form and disposed either longitudinally or transversely of the tread, and in the latter case may extend outwardly from one or both edges 34 of the base of each element.

Such projecting portions when disposed transversely of the tread serve to prevent wheel spin and to increase the braking power of the vehicle.

In all the above described constructions, instead of forming the elements of channel shape they may comprise a plate provided with a single projection extending longitudinally of the tread as in the case of the construction illustrated in Figures 1 to 11.

Further, in all of the above described constructions instead of making the plates from metal, they may be formed from a hard wood or vulcanite.

When the plates are made of metal they may if desired be coated with tin in order to improve the adherence thereto of the rubber forming the tread.

Where the elements are embedded within a tread formed separately from the tyre, instead of securing the tread in position by means of straps, any other suitable means may be employed.

What I claim is:—

1. A non-skid device for vehicle wheels comprising a tread, a resilient strip metal band extending longitudinally thereof, a plurality of strip metal elements of channel form in cross-section embedded within the tread with their sides extending longitudinally thereof, said elements being disposed with their bases in abutment with said band, the abutting parts of one of said strip metal members having a recess, the sides of the recessed portion of one member engaging the edges of the other member, means connecting the two members positively together and maintaining the elements in spaced relationship upon the band, and the sides of said elements extending outwardly of the tread to form a non-skid surface.

2. A non-skid device for vehicle wheels comprising a tread, a flexible band extending longitudinally of the tread and engaged on its outer side by the material thereof, a plurality of elements of channel form in cross-section located in spaced relationship by said band, the elements being arranged with their sides disposed substantially longitudinally of the tread, and projecting outwardly of the tread, the ends of said projecting sides being of convex configuration and having their medial parts substantially flush with the road engaging face of the tread to form non-skid surfaces, and the base of each element extending longitudinally of the tread beyond said medial part forming the non-skid surface.

BERTRAM PARROTT GRAY.